(12) United States Patent
Coimbatore et al.

(10) Patent No.: US 11,824,745 B1
(45) Date of Patent: Nov. 21, 2023

(54) REVERSE ENGINEERING COMPUTER NETWORK SYSTEM FUNCTIONALITY

(71) Applicant: Amazon Technologies, Inc., Seattle, WA (US)

(72) Inventors: Saravanan Rajagopal Coimbatore, Cupertino, CA (US); Jizhou Liao, San Jose, CA (US); Zi Yao Ding, San Jose, CA (US); Evan Corriere, Sunnyvale, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/066,938

(22) Filed: Dec. 15, 2022

(51) Int. Cl.
| | | |
|---|---|---|
| H04L 12/58 | (2006.01) | |
| H04L 29/06 | (2006.01) | |
| H04L 43/065 | (2022.01) | |
| H04L 43/04 | (2022.01) | |
| H04L 43/106 | (2022.01) | |
| H04L 67/56 | (2022.01) | |
| H04L 43/20 | (2022.01) | |
| H04L 69/22 | (2022.01) | |

(52) U.S. Cl.
CPC ............ *H04L 43/065* (2013.01); *H04L 43/04* (2013.01); *H04L 43/106* (2013.01); *H04L 43/20* (2022.05); *H04L 67/56* (2022.05); *H04L 69/22* (2013.01)

(58) Field of Classification Search
CPC .............................. H04L 12/58; H04L 29/06
USPC ......................................................... 709/224
See application file for complete search history.

(56) References Cited

U.S. PATENT DOCUMENTS

| | | | |
|---|---|---|---|
| 8,885,491 B1* | 11/2014 | Arya | H04W 4/06 370/250 |
| 2002/0120763 A1* | 8/2002 | Miloushev | H04L 67/1008 714/E11.034 |
| 2016/0285748 A1* | 9/2016 | Wang | H04L 45/66 |
| 2018/0013845 A1* | 1/2018 | Denoual | H04L 47/83 |
| 2021/0044570 A1* | 2/2021 | Hsu Liu | H04L 12/66 |

* cited by examiner

*Primary Examiner* — Jude Jean Gilles
(74) *Attorney, Agent, or Firm* — Knobbe, Martens, Olson & Bear, LLP

(57) ABSTRACT

A snapshot of a computer network system is taken in a virtualized environment. During a recording phase, a network message is recorded as it enters the computer network system. A logger generates log data that includes the headers of the network message as it enters and exits each server in the computer network system. An analysis server automatically analyzes the log data and determines whether there was a modification to a header of a network message and where the modification occurred. The contents of the changes reflected in the log data indicates functionality of the servers in the computer network system. The analysis server determines the dependencies between servers in the computer network system. The recorded data is used for test replays.

20 Claims, 7 Drawing Sheets

REVERSE ENGINEERING COMPUTER NETWORK SYSTEM FUNCTIONALITY

BACKGROUND

A reverse proxy can be a system that receives client requests (such as an Hypertext Transfer Protocol (HTTP) request) and forwards the client requests to network servers. The reverse proxy can consist of multiple servers. Each server can have different responsibilities. One server can be a Transport Layer Security (TLS) termination proxy (or a secure socket layer (SSL) termination proxy) that acts as an intermediary point between client and server applications and is used to terminate and/or establish TLS tunnels by decrypting and/or encrypting communications. Some servers can change the content and/or headers of a client request. Some servers can redirect the request to other servers and/or call back-end services. Trillions of requests can pass through the reverse proxy. The reverse proxy can be a legacy system, such that knowledge regarding behavior and functionality of servers in the system may be unknown or minimal.

BRIEF DESCRIPTION OF THE DRAWINGS

Various features, aspects, and advantages are described below with reference to the drawings, which are intended for illustrative purposes and should in no way be interpreted as limiting the scope of the embodiments. Furthermore, various features of different disclosed embodiments can be combined to form additional embodiments, which are part of this disclosure. In the drawings, like reference characters can denote corresponding features throughout similar embodiments. The following is a brief description of each of the drawings.

DETAILED DESCRIPTION

Figure 1A:
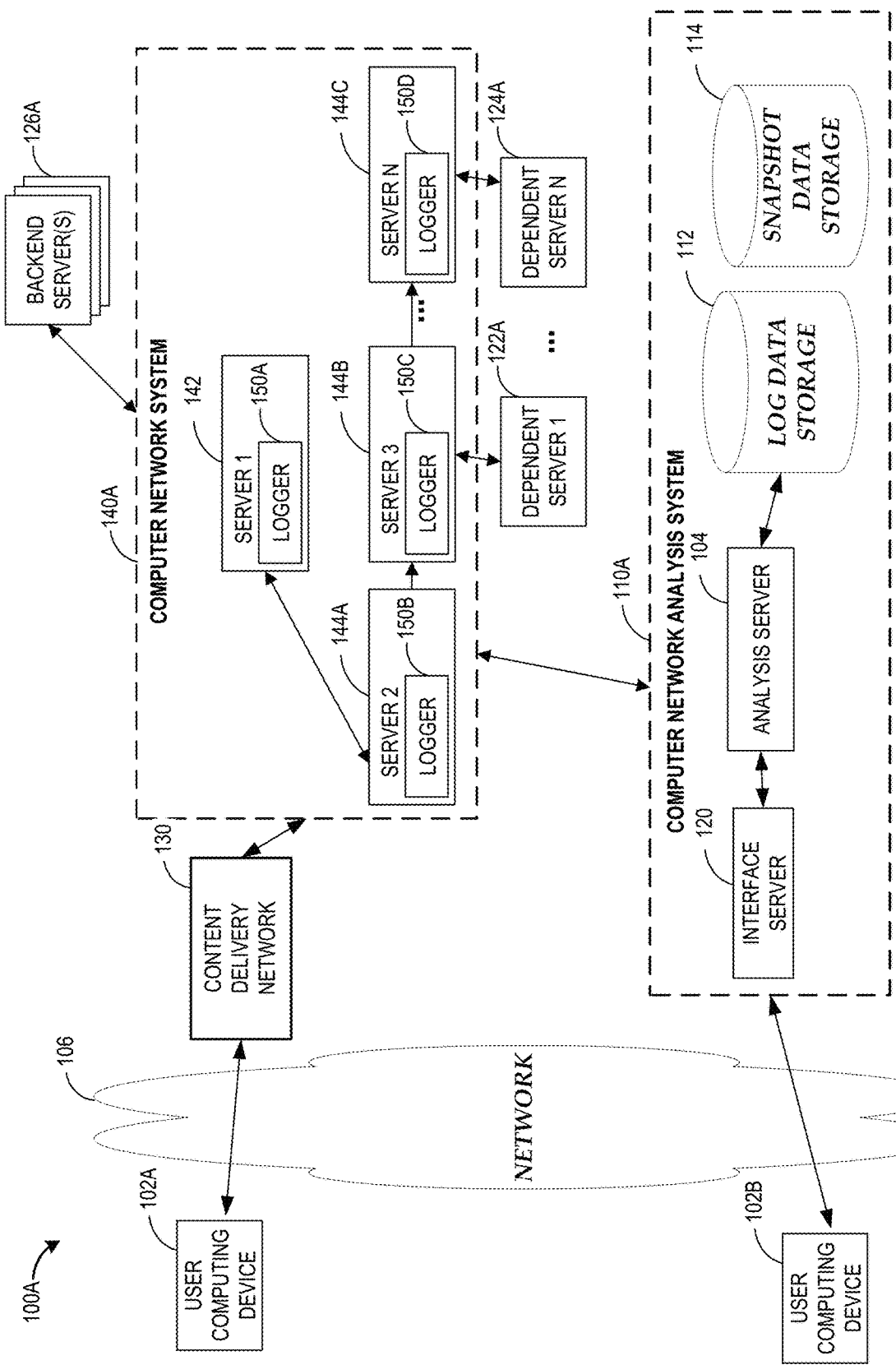
FIG. 1A is a schematic block diagram depicting an illustrative network environment with a Content Delivery Network, a computer network system, and computer network analysis system.

Computer network systems can be complex systems that receive and send trillions of network messages. As described above, some computer network systems can be legacy systems, such that knowledge regarding behavior and functionality of servers in the system may be unknown or minimal. Each server in the computer network system can have one or more responsibilities, such as, but not limited to, changing the content and/or headers of network messages, redirecting the request to other servers, calling back-end services, detecting potential bot traffic, and/or functioning as a TLS termination proxy. The multiple servers in a computer network system can have dependencies on one another. Computer networks systems that are legacy can be so complex that it can be technically challenging to make any changes to the system without causing undesirable side effects.

Generally described, some aspects of the present disclosure are directed to reverse engineering functionality in a computer network system. A snapshot of a computer network system can be taken before a recording phase. During a recording phase, a network message can be recorded as it enters the computer network system. A logger can generate log data that includes the headers of the network message as it enters and exits each server in the computer network system. In some embodiments, a network message can be identified with an identifier. In the computer network system, the logger can log the requests and responses to dependent servers and/or backend servers. An analysis server can automatically analyze the log data and determine whether there was a modification to a header of a network message and where the modification occurred. The contents of the changes reflected in the log data can indicate functionality of the servers in the computer network system. The analysis server can also determine the dependencies between servers in the computer network system. An interface server can provide the analysis results in a report. In some embodiments, the analysis results can answer one or more of the following questions. What are the possible network message modifications that each server can make? What are the headers added by the computer network system? In the computer network system, are there any duplicated changes, unnecessary work, etc.? Which servers are easiest to migrate? What is the dependency graph of the servers? Which features are used by each domain (such as the domain names used in a Content Delivery Network)?

Generally described, some aspects of the present disclosure are directed to creating an idempotent test environment out of a highly dynamic computer network system. As described above, a legacy computer network system can be so complex that it can be technically challenging to make any changes to the system without causing undesirable side effects. In a virtualized environment, a snapshot of a computer network system can be loaded. Before a replay phase, scripts can be executed in the virtualized environment to configure the computer network system. The scripts can disable any dynamic connections with external services in the snapshot, disable any external connections out of the snapshot, and/or update a configuration to point to a mock server. Code changes to a server in snapshot of the computer network system can be deployed. During the replay phrase, a test network message can be provided to the snapshot of the computer network system. The test network message can be created based on a previously recorded message that passed through the computer network system. A logger can generate first log data that includes the headers of the test network message as it enters and exits each server in the snapshot of the computer network system. An analysis server can compare the log data and identify any differences between the first log data and log data from previous recordings. The differences found in the log data can be provided in test results, which can indicate to a test user that the code changes to the server had unexpected behavior.

Turning to FIG. 1A, an illustrative network environment 100A is shown. The network environment 100A may include user computing devices 102A, 102B, a Content Delivery Network (CDN) 130, a computer network system 140A, backend server(s) 126A, dependent server(s) 122A, 124A, and a computer network analysis system 110A. The constituents of the network environment 100A may be in communication with each other either locally or over a network 106. As used herein, a "CDN" can refer to collection of devices, such as servers, routers, and/or switches that provide network content.

The user computing devices 102A, 102B can include, but are not limited to, a laptop or tablet computer, personal computer, personal digital assistant (PDA), hybrid PDA/mobile phone, smart wearable device (such as a smart watch), mobile phone, a smartphone, set-top or other television box, television or smart television, and/or video-game console or other gaming device. A first user computing device 102A can request content from the CDN 130. The second user computing device 102B can interact with the computer network analysis system 110A, which is described in further detail herein.

The computer network system 140A can include multiple servers 142, 144A, 144B, 144C. As described herein, the computer network system 140A can be a reverse proxy. A first server can be an asynchronous event-driven server, such as a NGINX® server. The one or more additional servers 144A, 144B, 144C can be multi-threaded network servers, such as Apache servers. Each of the servers 142, 144A, 144B, 144C can include a logger 150A, 150B, 150C, 150D. The loggers 150A, 150B, 150C, 150D can generate log data, which can be stored in the log data storage 112.

The CDN 130 can send a network message to the computer network system 140A. A network can include a request, such as, but not limited to, an HTTP request. As the servers 142, 144A, 144B, 144C process the network message, the servers 142, 144A, 144B, 144C can generate the log data, which can include, but is not limited to, header data of the network message at entry and exit points of each server. Some of the servers 144B, 144C can be configured to communicate with dependent servers 122A, 122B. The computer network system can communicate with backend server(s) 126A and forward along a network message. A logger can generate log data that includes the requests and responses associated with the dependent or backend servers 122A, 124A, 126A.

The computer network analysis system 110A can include an interface server 120, an analysis server 104, a log data storage 112, and a snapshot data storage 114. The analysis server 104 can analyze log data in the log data storage. In some embodiments, the analysis server 104 can identify headers that are identified by servers 142, 144A, 144B, 144C in the computer network system 140A based on the log data. For example, if a header is changed between an entry and an exit point at a particular server, then the analysis server 104 can determine that the particular server modified the header. The analysis server 104 can determine server dependencies based on the log data. The analysis server 104 can determine a server invocation sequence based on the log data. In some embodiments, the analysis server 104 can determine the server invocation sequence based on server invocation sequence in the log data, message identifiers in the log data, time indicators in the log data, and/or other indicia in the log data. In some embodiments, the interface server 120 can provide a report to the user computing device 102B. The report can include analysis information determined by the analysis server 104, such as, but not limited to, indications of header modification by particular servers, dependencies between servers, identified functionality at particular servers, as described herein. In some embodiments, prior to a recording phase, the computer network analysis system 110A can create a snapshot of the computer network system 140A, which can include capturing the state of the servers 142, 144A, 144B, 144C. The computer network analysis system 110A can store the snapshot in the snapshot data storage 114. Snapshots can be used for testing purposes, as described herein.

In some embodiments, the user computing device 102B can request, via the computer network analysis system 110A, analysis information for a time period. In some embodiments, the user computing device 102B can request, via the computer network analysis system 110A, analysis information based on user specified criteria, such as, but not limited to, a particular type of network message, a particular type of domain, or a particular message identifier. In some embodiments, the interface server 120 can communicate with the computer network system 140A to control the type of recording, such as recording network traffic based on the user specified criteria.

The log data storage 112 and/or the snapshot data storage 114 may be embodied in hard disk drives, solid state memories, or any other type of non-transitory computer-readable storage medium. The log data storage 112 and/or the snapshot data storage 114 may also be distributed or partitioned across multiple local and/or remote storage devices. The log data storage 112 and/or the snapshot data storage 114 may include a data store. As used herein, a "data store" can refer to any data structure (and/or combinations of multiple data structures) for storing and/or organizing data, including, but not limited to, relational databases (e.g., Oracle databases, MySQL databases, etc.), non-relational databases (e.g., NoSQL databases, etc.), key-value databases, in-memory databases, tables in a database, a file store, and/or any other widely used or proprietary format for data storage.

The network 106 may be any wired network, wireless network, or combination thereof. In addition, the network 106 may be a personal area network, local area network, wide area network, cable network, satellite network, cellular telephone network, or combination thereof. In addition, the network 106 may be a publicly accessible network of linked networks, possibly operated by various distinct parties, such as the Internet. In some embodiments, the network 106 may be a private or semi-private network, such as a corporate or university intranet. The network 106 may include one or more wireless networks, such as a Global System for Mobile Communications (GSM) network, a Code Division Multiple Access (CDMA) network, a Long-Term Evolution (LTE) network, or any other type of wireless network. The network 106 can use protocols and components for communicating via the Internet or any of the other aforementioned types of networks, such as HTTP.

Additionally, in some embodiments, the computer network system 140A and/or the computer network analysis system 110A or components thereof are implemented by one or more virtual machines implemented in a hosted computing environment. The hosted computing environment may include one or more rapidly provisioned and/or released computing resources. The computing resources may include hardware computing, networking and/or storage devices configured with specifically configured computer-executable instructions. A hosted computing environment may also be referred to as a serverless, cloud, or distributed computing environment.

Figure 1B:
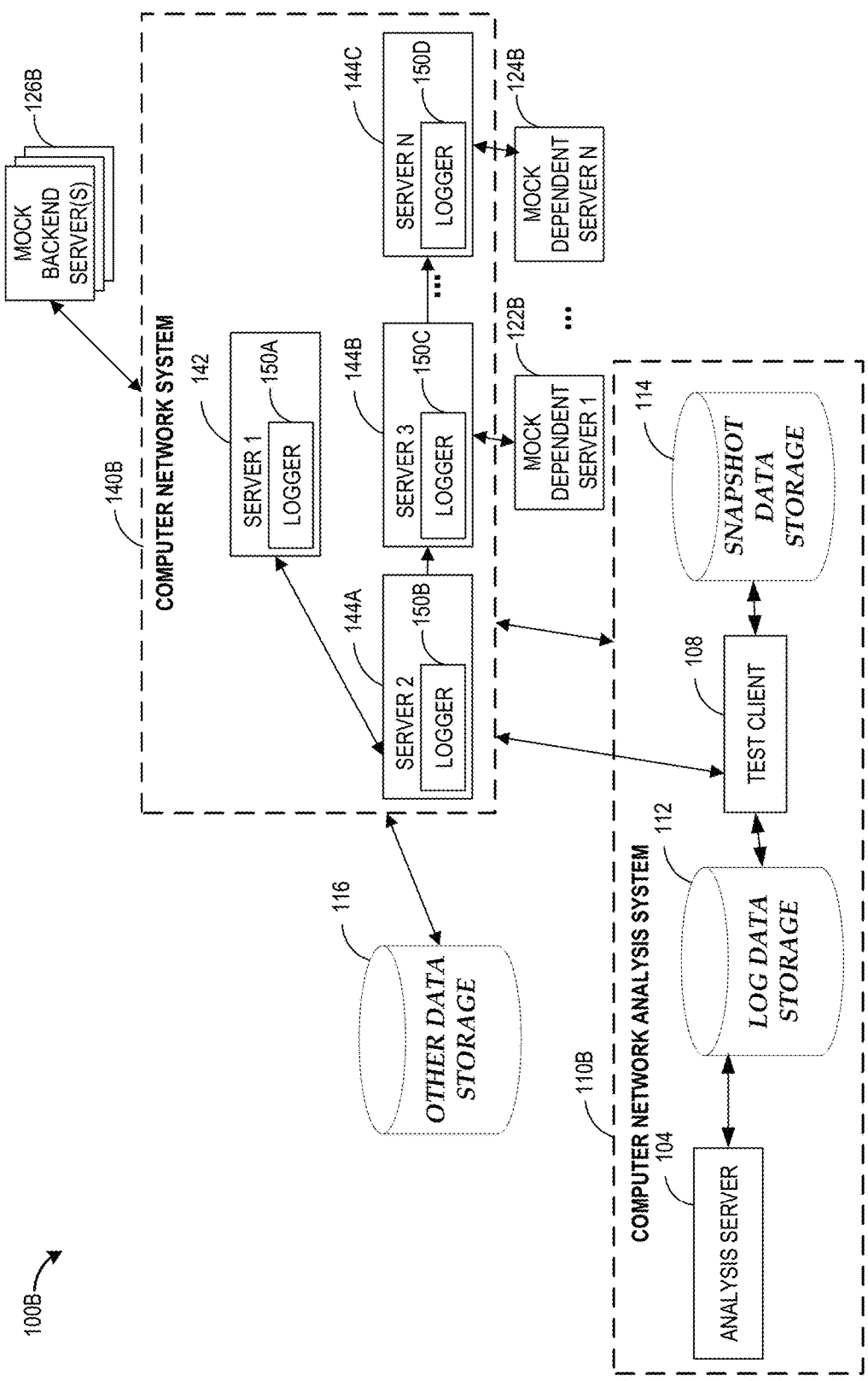
FIG. 1B is a schematic block diagram depicting another illustrative network environment with a computer network system, and computer network analysis system.

Turning to FIG. 1B, another illustrative network environment 100B is shown. The network environment 100B of FIG. 1B may be similar to the network environment 100A of FIG. 1A. However, the network environment 100B of FIG. 1B may be configured for testing purposes. For example, the test client 108 of the computer network analysis system 110B can load a snapshot of the computer network system 140B in a virtualized environment, as shown. The test client 108 can also disable communications, such as disabling communications with the other data storage 116. The test client 108 can also update configuration in the snapshot of the computer network system 140B to point to the mock servers 122B, 124B, 126B. The test client can also update code instructions to a server 142 in the snapshot of the computer network system 140B. The mock servers 122B, 124B, 126B can be configured to provide previously recorded responses based on received requests. By replaying test network messages in the computer network system 140B with the updated code instructions, the analysis server 104 can compare previous network state(s) with network state(s) generated by the updated code instructions and other servers in the snapshot of the computer network system 140B to determine if there was any unexpected behavior in the snapshot as a result of the updated code instructions.

Figure 2:
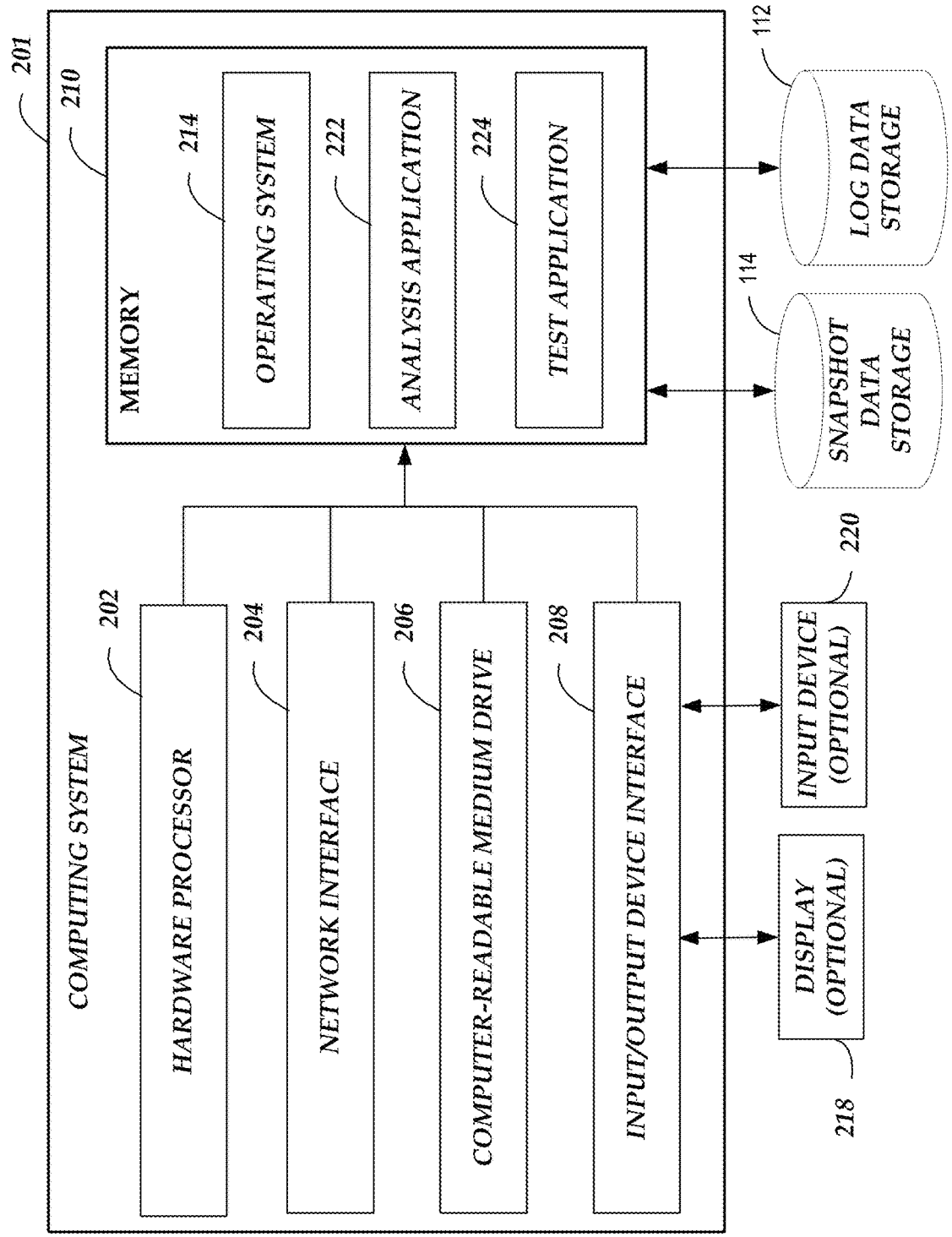
FIG. 2 is a schematic diagram depicting an illustrative general architecture of a computing system for implementing one or more devices referenced in the network environments depicted in FIGS. 1A, 1B.

FIG. 2 is a schematic diagram of an illustrative general architecture of a computing system 201 for implementing a computer network analysis system 110A, 110B referenced in the environments 100A, 100B in FIGS. 1A, 1B. The computing system 201 includes an arrangement of computer hardware and software components that may be used to execute the analysis application 222 and/or the test application 224. The general architecture of FIG. 2 can be used to implement other devices described herein, such as the user computing device 102A, 102B referenced in FIG. 1A. The computing system 201 may include more (or fewer) components than those shown in FIG. 2. Further, other computing systems described herein may include similar implementation arrangements of computer hardware and/or software components.

The computing system 201 for implementing a device within the computer network analysis system 110A, 110B may include a hardware processor 202, a network interface 204, a non-transitory computer-readable medium drive 206, and an input/output device interface 208, all of which may communicate with one another by way of a communication bus. As illustrated, the computing system 201 is associated with, or in communication with, an optional display 218 and an optional input device 220. The network interface 204 may provide the computing system 201 with connectivity to one or more networks or computing systems. The hardware processor 202 may thus receive information and instructions from other computing systems or services via the network 106. The hardware processor 202 may also communicate to and from memory 210 and further provide output information for an optional display 218 via the input/output device interface 208. The input/output device interface 208 may accept input from the optional input device 220, such as a keyboard, mouse, digital pen, and/or touch screen. The input/output device interface 208 may also output audio data to speakers or headphones (not shown).

The memory 210 may contain specifically configured computer program instructions that the hardware processor 202 executes in order to implement one or more embodiments of a device within the computer network analysis system 110A, 110B. The memory 210 generally includes RAM, ROM and/or other persistent or non-transitory computer-readable storage media. The memory 210 may store an operating system 214 that provides computer program instructions for use by the hardware processor 202 in the general administration and operation of the device within the computer network analysis system 110A, 110B.

The memory 210 may include the analysis application 222 and/or the test application 224 that may be executed by the hardware processor 202. In some embodiments, the analysis application 222 and/or the test application 224 may implement various aspects of the present disclosure. In some embodiments, the analysis application 222 can analyze log data from the log data storage 112 and provide the results of that analysis. In some embodiments, the test application 224 can load a snapshot from the snapshot data storage 114. As described herein, the test application 224 can replay a test network message in the snapshot, which can cause additional log data to be stored. The analysis application 222 can compare previous log data with log data generated in the snapshot to determine if any unexpected behavior was observed in the snapshot.

Figure 3:
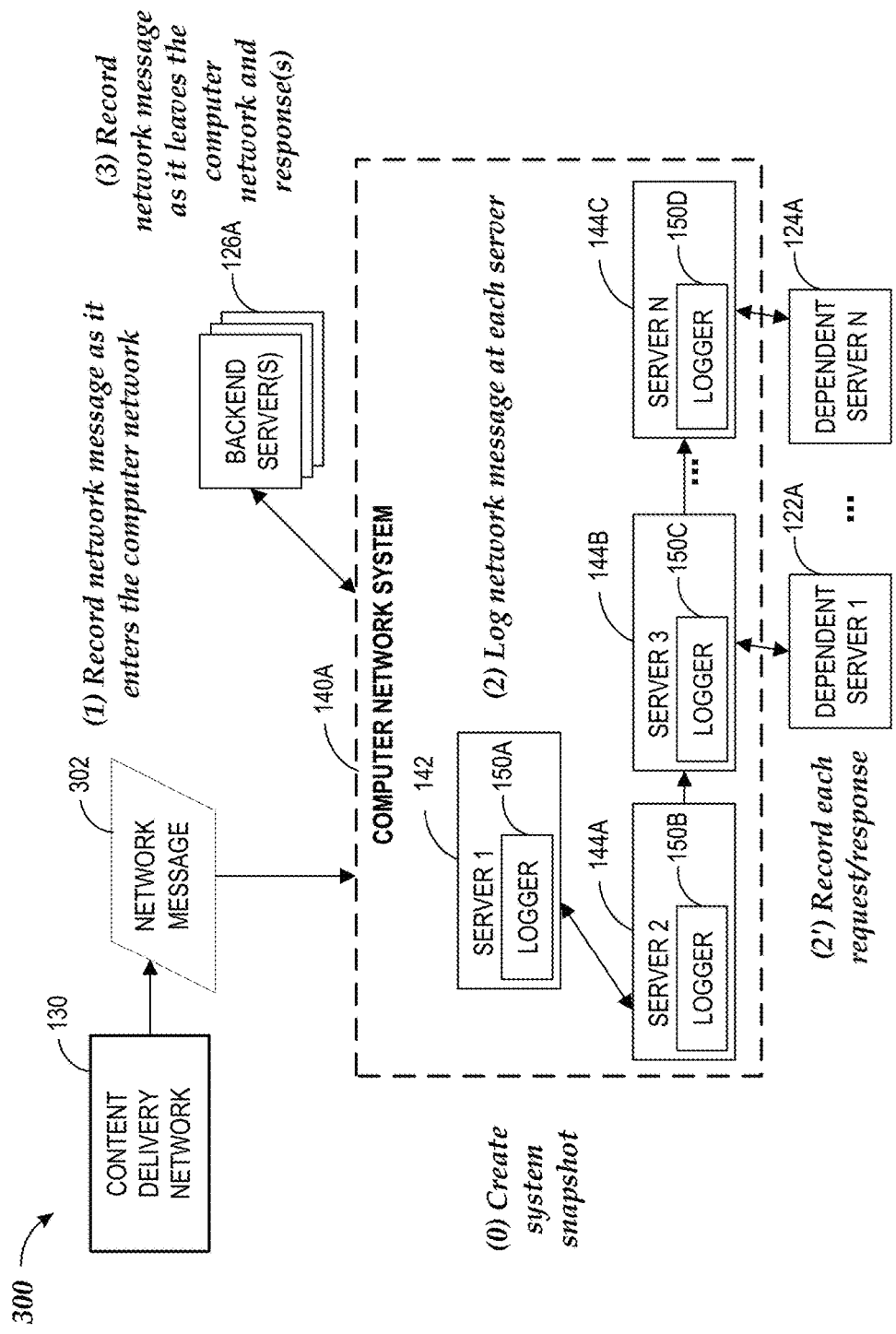
FIG. 3 is a flow diagram depicting illustrative interactions for logging computer network state to reverse engineer computer network functionality.

With reference to FIG. 3, in some embodiments, illustrative interactions are depicted for logging network state data in a computer network system 140A. The environment 300 of FIG. 3 can be similar to the environment 100A of FIG. 1A. Other interactions (not illustrated) may be possible in accordance with the present disclosure in other embodiments. Similar to the communication depictions of FIG. 1A, not every possible communication may be depicted in FIG. 3.

The interactions of FIG. 3 begin at step zero (0), where a system snapshot can be created. A computer network analysis system 110A (not illustrated) can create the snapshot of the computer network system 140A before any logging occurs. The snapshot can capture state of the servers 142, 144A, 144B, 144C, including associated configuration files. As described herein, the computer network system 140A may be implemented in a virtualized environment and the snapshot can be a machine image of the computer network system 140A in the virtualized environment.

At step one (1), a recording phase can begin and the computer network analysis system 110A can record the network message 302 (such as an HTTP request) as it enters the computer network system 140A from the CDN 130. In some embodiments, the computer network analysis system 110A can store the complete network message 302 in the log data storage 112. As described herein, a recorded network message 302 can be used for testing purposes.

At step two (2), the network message can be logged and can include information regarding the state of the network message at each entry and exit point in each server 142, 144A, 144B, 144C in the computer network system 140A. Log data can include the headers of a network message, such as the headers of an HTTP request. The log data that is created can include one or more of the fields provided below in Table 1. In some embodiments, the data that is logged can depend on the type of server performing the logging. For example, the logger 150A at a first server 142, such as an NGINX server, can log data with a first set of fields for the first server type; and a different logger 150B at a second server 144A, such as an Apache server, can log data with a second set of fields for a second server type.

TABLE 1

Log Data Fields

MessageId
EndTime

TABLE 1-continued

Log Data Fields

StartTime
Time
HTTP_HOST
Operation
OriginalRequest
NginxIntialHeaders
ApacheExtras
ApacheHeaders
MergedHeaders The log data that is created can alternatively include one or more of the fields provided below in Table 2. For example, the logger 150B at a second server 144A, such as an Apache server, can log data with second set of fields for a second server type, as shown in Table 2.

TABLE 2

Additional Log Data Fields

EndTime
StartTime
Time
StatusCode
MessageID
ServerCalledInSequence
InitialHeadersIn
HeadersInAnalysis
InitialHeadersOut
HeadersOutAnalysis
InitialHeadersErr
HeadersErrAnalysis
InitialSubEnv
SubEnvAnalysis
AnalysisErrors At step two-prime (2'), each request and response between the servers 144B, 144C and the dependent servers 122A, 124B can be recorded. In some embodiments, the computer network analysis system 110A can store the complete requests and responses in the log data storage 112. As described herein, the request and responses can be used for testing purposes.

At step three (3), each network message that leaves the computer network system 140A and corresponding response between the one or more backend servers 126A can be recorded. In some embodiments, the computer network analysis system 110A can store the complete network messages and responses in the log data storage 112. As described herein, the outgoing network messages and responses can be used for testing purposes.

As described herein, the computer network analysis system 110A can analyze the log data. For example, the analysis server 104 can analyze the log data, such as the "HeadersOutAnalysis" field from Table 2, which can include a value, such as "ModBot:EmergencyLever=BOT". The analysis server 104 can determine from the foregoing log data that a module in the second server 144A, 144B, 144C added the header data. The analysis server 104 can analyze additional log data, such as the "MergedHeaders" field from Table 1, which can include the same value from the other log data, such as "ModBot:EmergencyLever=BOT". The analysis server 104 can determine from the foregoing log data that the header was included in the response from a second server 144A, 144B, 144C and merged into a header at the first server 142. Moreover, the analysis server 104 can determine from the log data, such as the ServerCalledInSequence field from Table 2, the servers that were called before and/or after the point at which the log data was created.

As another example, the analysis server 104 can analyze the log data, such as the "SubEnvAnalysis" field from Table 2 (an environment variables field), which can include a value, such as "New(env-var-Bot=1), New(env-var-Robots-All=1)". The analysis server 104 can determine from the foregoing log data that functionality in the second server 144A, 144B, 144C added one or more tags (such as "New (env-var-Bot=1), New(env-var-Robots-All=1)," which can indicate that BOT traffic was detected) for a particular domain. Therefore, if the second server 144A, 144B, 144C is deprecated, migrated, and/or upgraded, it can be ensured that the features used by each domain are preserved.

Figure 4:
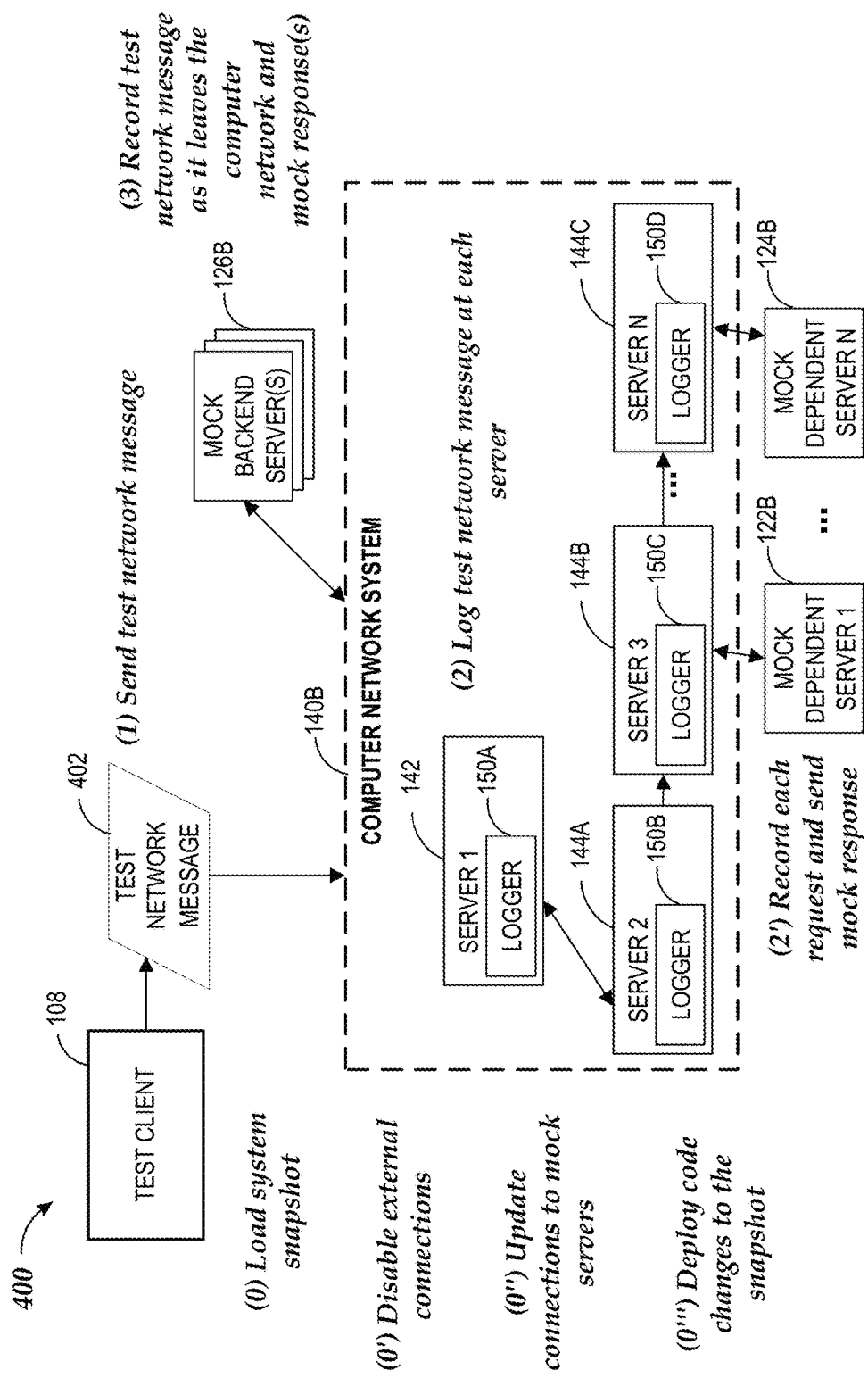
FIG. 4 is a flow diagram depicting illustrative interactions for creating a test environment and replaying computer network traffic in the test environment to test changes to a computer network.

With reference to FIG. 4, in some embodiments, illustrative interactions are depicted for creating a test environment 400 and replaying computer network traffic in the test environment to test changes to a computer network. An advantage of the test environment 400 is that the test environment 400 can be configured not to affect any external services or data while being an accurate replication of the production environment 300 of FIG. 3 for testing purposes. The test environment 400 of FIG. 4 can be similar to the environment 100B of FIG. 1B. Other interactions (not illustrated) may be possible in accordance with the present disclosure in other embodiments. Similar to the communication depictions of FIG. 1B, not every possible communication may be depicted in FIG. 4.

The interactions of FIG. 4 begin at step zero (0), where a system snapshot can be loaded. A computer network analysis system 110B (not illustrated) can load the snapshot. The snapshot can include state for the servers 142, 144A, 144B, 144C, including any associated configuration files. As described herein, the computer network system 140B may be implemented in a virtualized environment and the snapshot can be the machine image of the computer network system 140A of FIG. 1A in the virtualized environment.

At step zero-prime (0'), external connections can be disabled. The test client 108 can disable the connections to the other data storage 116 in the snapshot of the computer network system 140B. At step zero-double-prime (0″), the connections to mock servers can be updated. The test client 108 can update connections to point the servers 142, 144A, 144B, 144C, where applicable, to communicate with mock servers 122B, 124B, 126B instead of actual production servers in the snapshot of the computer network system 140B. At step zero-triple-prime (0‴), code changes can be deployed to the snapshot of the computer network system 140B. The test client 108 can update code instructions in any of the servers 142, 144A, 144B, 144C for developer testing.

At step one (1), a test network message 402 (such as an HTTP request) can be sent by the test client 108 to the computer network system 140B. As described herein, the test network message 402 can be identical to a network message 302 from a previously recorded network session, as described herein, such as with respect to FIG. 3.

At step two (2), the test network message can be logged and can include information regarding the state of the network message at each entry and exit point in each server 142, 144A, 144B, 144C in the computer network system 140B. The test data can include the headers of a network message, such as the headers of an HTTP request. The test log data that is created can include one or more of the fields provided below in Table 1. In some embodiments, the test data that is logged can depend on the type of server performing the logging. For example, the logger 150A at a first server 142, such as an NGINX server, can log test data with a first set of fields for the first server type; and a different logger 150B at a second server 144A, such as an Apache server, can log test data with second set of fields for a second server type. The test log data that is created can include alternative one or more of the fields provided below in Table 2. For example, the logger 150B at a second server 144A, such as an Apache server, can log data with second set of fields for a second server type, as shown in Table 2.

At step two-prime (2'), each test request from the servers 144B, 144C to the mock dependent servers 122B, 124B can be recorded. The mock dependent servers 122B, 124B can respond to the requests with mock responses based on the previously recorded data, as described herein.

At step three (3), each network message that is sent from the computer network system 140B to the one or more backend servers 126B can be recorded. The mock backend server(s) 126B can respond to the network message with mock responses based on the previously recorded data, as described herein. As described herein, the analysis server 104 can compare log and recorded data from a previous session to log and recorded data from a recent test session. The analysis server 104 can identify any discrepancies between the data from the previous session and the recent test session, which can indicate that the updated code instructions may have introduced errors to the computer network system 140B.

Figure 5:
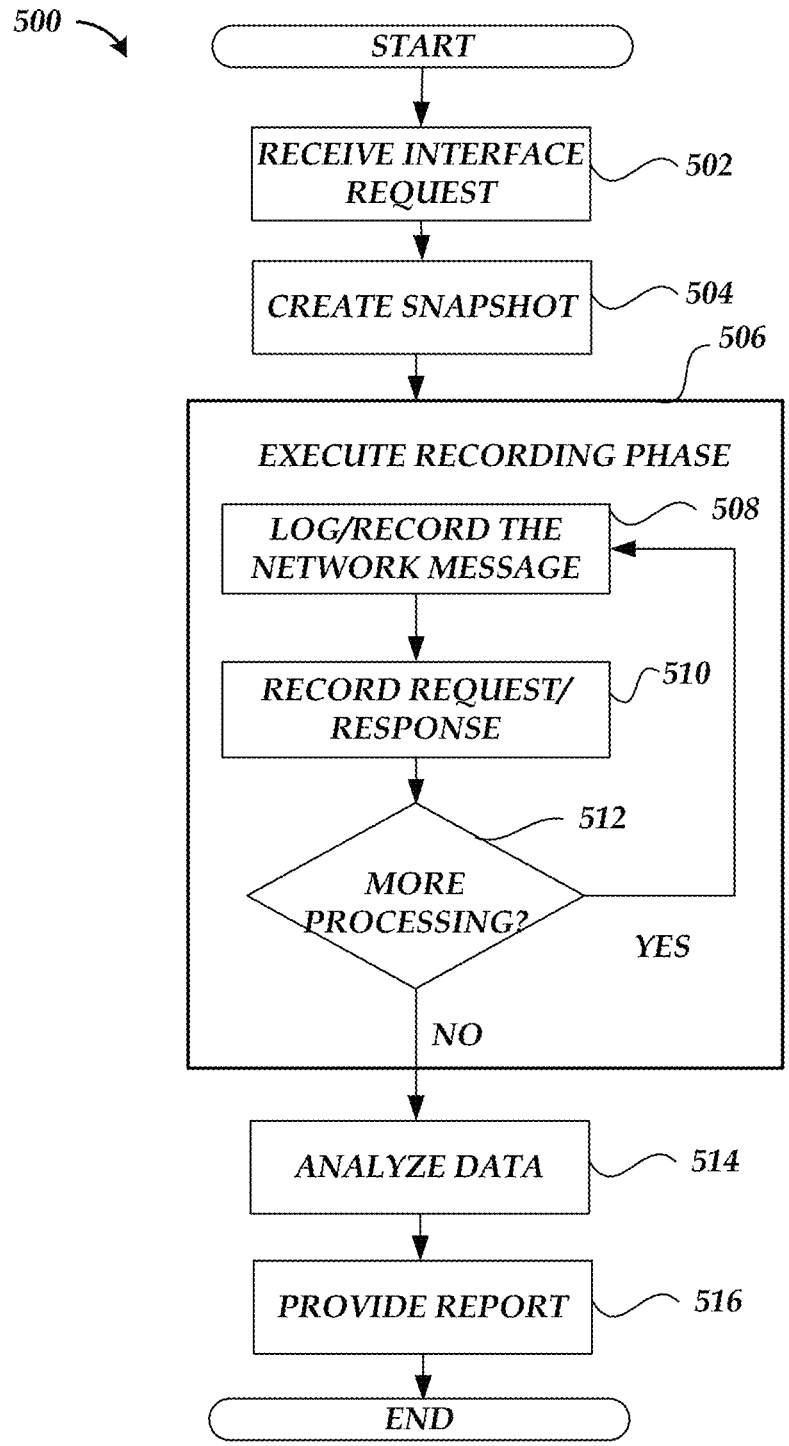
FIG. 5 is a flow chart depicting a method for logging and analyzing computer network state.

FIG. 5 is a flow chart depicting a method 500 implemented by the computer network system 140A and the computer network analysis system 110A of FIG. 1A for logging and analyzing computer network state. As described herein, the computer network system 140A and the computer network analysis system 110A of FIG. 1A may include various devices, services, and/or applications, some of which may implement aspects of the method 500 as described herein. Additional details regarding aspects of the method 500 are described in further detail herein, such as with respect to FIG. 3.

Beginning at block 502, an interface request can be received. The interface server 120 can receive an interface request. The interface server 120 can include an Application Programming Interface (API). The API can receive a request to log network data associated with a domain name for a period of time. The computer network analysis system 110A can initiate logging of network data associated with the domain name for the period of time. The loggers 150A, 150B, 150C, 150D can create log data for a network message associated with the domain name. In some embodiments, the API can receive a request to log network data associated with a type of network message, a type of domain name, and/or a message identifier. The computer network analysis system 110A can initiate logging of network data associated with the type of network message, the type of domain name, and/or the message identifier. The loggers 150A, 150B, 150C, 150D can create log data for a network message associated with the type of network message, the type of domain name, and/or the message identifier. In some embodiments, the computer network analysis system 110A can cause network messages to be tagged for logging. In other embodiments, the computer network system 140A can consult a backend service to determine whether a network message should be logged.

At block 504, a snapshot of the computer network system 140A can be created. The computer network analysis system 110A can create a snapshot of the computer network system 140A. The snapshot can capture state of the servers 142, 144A, 144B, 144C, including associated configuration files. The computer network system 140A may be implemented in a virtualized environment and the snapshot can be a machine image of the computer network system 140A in the virtualized environment. The computer network analysis system 110A can store the snapshot in the snapshot data storage 114. The snapshot can be used for testing purposes, as described herein, such as with respect to FIG. 6.

At block 506, the recording phase can be executed. The computer network analysis system 110A can initiate the recording phase. Executing the recording phase can include executing of the sub-blocks 508, 510, 512. Additional details regarding the computer network analysis system 110A executing the recording phase are described in further detail herein, such as with respect to FIG. 3.

At block 508, a network message can be logged and/or recorded. When the computer network system 140A receives a network message (such as an HTTP request), the network message can be stored in the log data storage 112. In some embodiments, the computer network analysis system 110A can store the network message in its entirety in the log data storage 112. As described herein, the stored network message can be used as a test network message for replay purposes.

At each server 142, 144A, 144B, 144C, the logger 150A, 150B, 150C, 150D can determine log data at an entry point and an exit point at the server. The logger 150A, 150B, 150C, 150D can store the log data in the log data storage 112. The logger 150A, 150B, 150C, 150D can determine different types of log data, such as, but not limited to, a header of the network message at an entry point at the server and an another header of the network message at an exit point at the server. The logger 150A, 150B, 150C, 150D can determine server invocation sequence data for a network message. In some embodiments, each logger 150A, 150B, 150C, 150D can append a current server (or a current module within a server) to server invocation sequence data in the network message. Additional log data can include, but is not limited to, a server identifier, header additions, header deletions, elapsed time (which can indicate the latency at each server), contents of the network message (such as environment variables), a domain name associated with the network message, and/or metadata regarding the functionality at each entry/exit point of a server. The logger 150A, 150B, 150C, 150D can determine an elapsed time to process the network message at a server. Additional details regarding log data are described herein, such as with respect to FIG. 3 and Tables 1 and 2.

At block 510, requests and responses can be recorded. At various points while each server 142, 144A, 144B, 144C is executing, the server 142, 144A, 144B, 144C can make calls to servers 122A, 124A, 126A. At each of these points, the logger 150A, 150B, 150C, 150D can store the corresponding request and response data in the log data storage 112. As described herein, the stored requests and responses can be used for testing replay purposes.

At block 512, it can be determined whether there are more server(s) 142, 144A, 144B, 144C configured to continue processing the network message. Once each server 142, 144A, 144B, 144C processes a network message, the server 142, 144A, 144B, 144C can have a next step, such as, but not limited to, passing the network message to another server 142, 144A, 144B, 144C. While there is further server 142, 144A, 144B, 144C processing to be completed, the method 500 returns to block 508 for continued logging of the network message. As described herein, the logger 150A, 150B, 150C, 150D can change the log data (such as the fields that are logged) based on the type of server 142, 144A, 144B, 144C. At some point, the next step of servers 142, 144A, 144B, 144C can be passing the network message to a server 126A such that the network message may not return back to the computer network system 140A. At that point, there are no further servers 142, 144A, 144B, 144C for processing and the method 500 proceeds to block 514 to analyze data.

At block 514, data can be analyzed. The analysis server 104 can automatically analyze the logged and/or recorded data. The analysis server 104 can determine, from the log data, a header modification based on a change identified from a header logged at an entry point at the server and a header logged at an exit point at the server. For example, if data is removed or added to a header between the entry and exit points, the analysis server 104 can determine that the server likely made the change. The analysis server 104 can determine, from the log data, functionality at the server based on the content from the network message. For example, an environment variable in the network message can include a BOT detection tag and the analysis server 104 can determine that the server likely has BOT detection functionality. The analysis server 104 can determine, from the log data, a dependency of a second server on a first server based on the server invocation sequence data. For example, the analysis server 104 can determine that server A depends on server B if server B was invoked first in the sequence data and server A was invoked after server B. In some embodiments, the analysis server 104 can generate summary data. The analysis server 104 can aggregate log data and determine summary information, such as, but not limited to, the servers that use particular functionality, a dependency graph, any unused servers or functionality, and/or servers with the highest latency. In some embodiments, the analysis server 104 can generate alerts, such as, but not limited to, servers with high latency or servers that are outputting erroneous data.

At block 516, a report can be provided. The interface server 120 can provide a report with the results from the analysis server 104. In some embodiments, the report can include one or more of the following: an indication of the header modification by a server; an indication of the dependency of a second server on a first server; an indication of the functionality at a server; an indication of the elapsed time at the server. In some embodiments, the report can include summary data as described herein. In some embodiments, the report can be provided in a graphical user interface. The graphical user interface can include, but is not limited to, a dashboard user interface with metrics and/or alerts. In some embodiments, network engineers can make changes to the computer network system 140A based on the analysis information. For example, network engineers can determine that certain functionality can be located to earlier in the processing stream for efficiency purposes (such as moving BOT detection to earlier in the processing flow the computer network system 140A will process network messages less or not at all when they have been associated with BOT activity).

Figure 6:
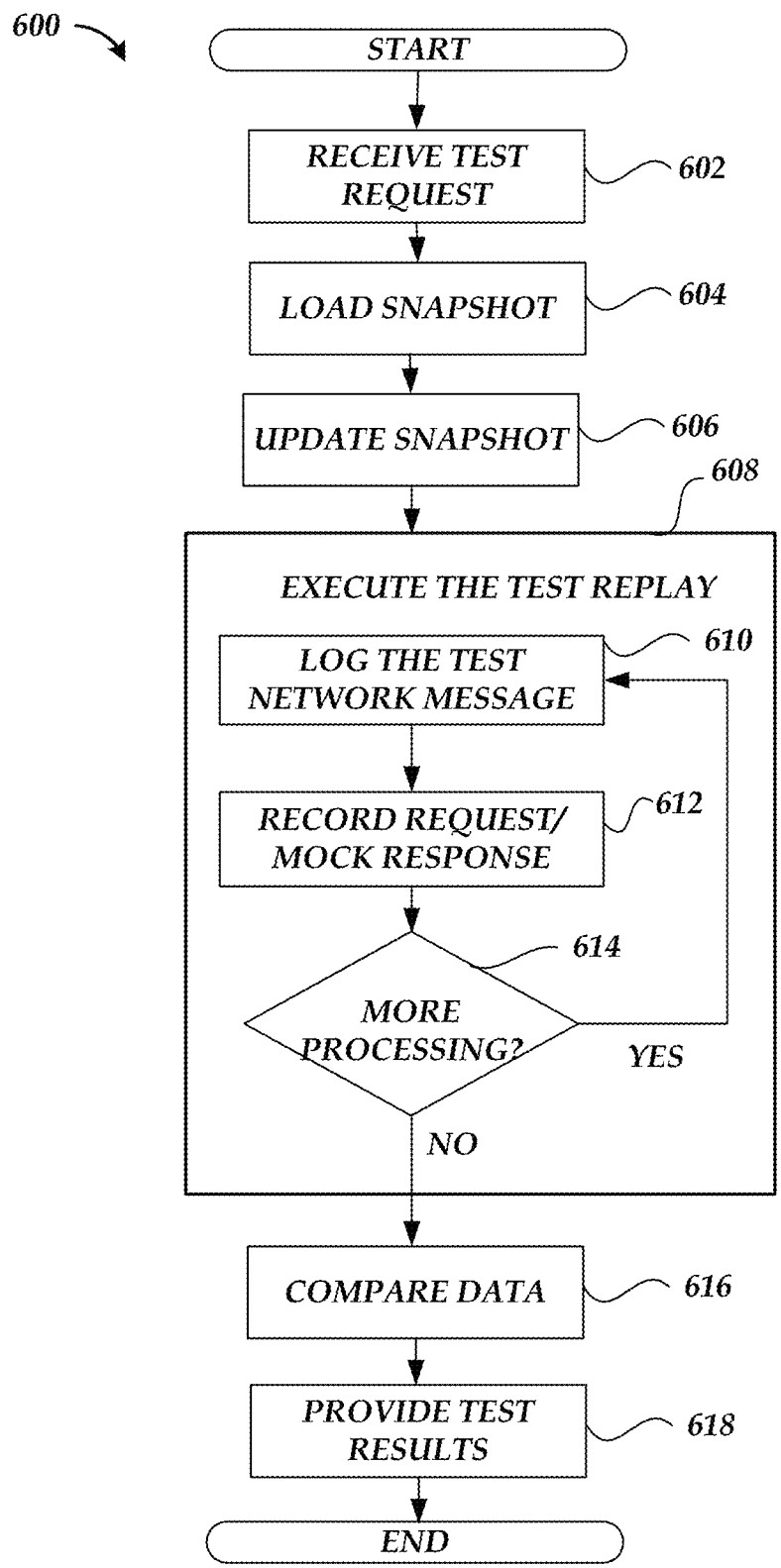
FIG. 6 is a flow chart depicting a method for creating a test environment and replaying computer network traffic in the test environment to test changes in a computer network system.

FIG. 6 is a flow chart depicting a method 600 implemented by the computer network system 140B and the computer network analysis system 110B of FIG. 1B for creating a test environment and replaying computer network traffic in the test environment to test changes in a computer network system 140B. As described herein, the computer network system 140B and the computer network analysis system 110B of FIG. 1B may include various devices, services, and/or applications, some of which may implement aspects of the method 600 as described herein. Additional details regarding aspects of the method 600 are described in further detail herein, such as with respect to FIG. 4.

Beginning at block 602, a test request can be received. The test client 108 can include an API. The API can receive a request to replay processing of a test network message. In some embodiments, the request can include a message identifier for the test network message. In other embodiments, the request can include a test identifier that can identify a collection of test network messages to be replayed on the computer network system 140B. In some embodiments, the test client 108 can include a graphical user interface. Additionally or alternatively, the test client 108 can include another interface, such as, but not limited to, a command-line interface for testing.

At block 604, a snapshot can be loaded. The test client 108 can load the snapshot from the snapshot data storage 114. The computer network system 140B can be in a virtualized environment. As described herein, loading the snapshot by the test client 108 can cause the state associated with the computer network system 140B to be instantiated in the virtualized environment to mimic the exact state before the previous recording. The snapshot at block 604 of FIG. 6 can be the same machine image that was created at block 504 of FIG. 5.

At block 606, the snapshot can be updated. The test client 108 can update the loaded snapshot. The test client 108 can update configuration to point to a mock server in the snapshot. As described herein, an advantage of the test environment 400 can be that the tests executed in the environment can mimic a production environment but not impact any production servers or services since the servers 142, 144A, 144B, 144C can point to mock servers 122B, 124B, 126B, where applicable. The test client 108 can update code instructions to a server in the snapshot. As described herein, a developer may want to test a change to a server 142, 144A, 144B, 144C, but since the system 140B may be a legacy system, it would be advantageous to test the change in an environment that is as close-to-production-like as possible. The test client 108 can disable an external connection with a server in the updated snapshot of the computer network system 140B. In some embodiments, if the external connection provides data, the server can be configured to receive static data corresponding to data previously received from the external connection. The external connection could be a connection to an object storage or file storage database for example. At the end of block 606, the updated snapshot of the computer network system 140B can be ready for testing.

At block 608, a test replay can be executed. The test client 108 can initiate the test replay. The test client 108 can transmit, to the updated snapshot of the computer network system 140B, a test network message 402. As described herein, the test network message 402 can be a network message 302 from a previously recorded session associated with the snapshot. Executing the test replay can include executing the sub-blocks 610, 612, 614. Additional details regarding the computer network analysis system 110B executing a test replay is described in further detail herein, such as with respect to FIG. 4.

At block 610, a test network message can be logged. At each server 142, 144A, 144B, 144C, the logger 150A, 150B, 150C, 150D can determine log data at an entry point and an exit point at the server. Block 610 for logging a test network message can be similar to block 508 of FIG. 5 for logging a network message. The logger 150A, 150B, 150C, 150D can store the log data in the log data storage 112. The logger 150A, 150B, 150C, 150D can determine different types of log data, such as, but not limited to, a header of the test network message at an entry point at the server and another header of the test network message at an exit point at the server. The logger 150A, 150B, 150C, 150D can determine server invocation sequence data for a test network message. In some embodiments, each logger 150A, 150B, 150C, 150D can append a current server (or a current module within a server) to server invocation sequence data in the test network message. Additional log data can include, but is not limited to, a server identifier, header additions, header deletions, elapsed time (which can indicate the latency at each server), contents of the test network message (such as environment variables), a domain name associated with the test network message, and/or metadata regarding the functionality at each entry/exit point of a server. The logger 150A, 150B, 150C, 150D can determine an elapsed time to process the test network message at a server. Additional details regarding log data are described herein, such as with respect to FIG. 3 and Tables 1 and 2.

At block 610, requests can be recorded and mock responses can be returned. At various points while each server 142, 144A, 144B, 144C is executing, the server 142, 144A, 144B, 144C can make calls to mock servers 122B, 124B, 126B. At each of these points, the mock servers 122B, 124B, 126B can receive the requests and return mock responses based on previously recorded data. The servers 142, 144A, 144B, 144C can be configured request and receive response data from the mock server. The logger 150A, 150B, 150C, 150D can store the request in the log data storage 112.

At block 614, it can be determined whether there are more server(s) 142, 144A, 144B, 144C configured to continue processing the test network message. Block 616 for checking for additional processing can be similar to block 512 of FIG. 5 for checking for additional processing. Once each server 142, 144A, 144B, 144C processes a test network message, the server 142, 144A, 144B, 144C can have a next step, such as, but not limited to, passing the test network message to another server 142, 144A, 144B, 144C. While there is further server 142, 144A, 144B, 144C processing to be completed, the method 600 returns to block 610 for continued logging of the test network message. As described herein, the logger 150A, 150B, 150C, 150D can change the log data (such as the fields that are logged) based on the type of server 142, 144A, 144B, 144C. At some point, the server's 142, 144A, 144B, 144C next step can be passing the network message to a server 126B such that the network message may not return back to the computer network system 140B. At that point, there are no further servers 142, 144A, 144B, 144C for processing and the method 600 proceeds to block 616 to compare data.

At block 616, data can be compared. The analysis server 104 can automatically compare the logged data. The analysis server 104 can determine a difference between first log data (such as data from a test replay) and second log data (such as data from a previously recorded session). The analysis server 104 can determine a difference between a header of the test network message and a header of the network message from the previously recorded session. An unexpected change in a header can indicate that the updated code instructions have an unintended effect on the computer network system 140B. The analysis server 104 can identify that an elapsed time to process the test network message and an elapsed time from previous log data fail to satisfy a threshold. For example, if the elapsed time to process the test network message is a threshold percentage slower than the time to proves the same network message from a previously recorded session then that can indicate that the updated code instructions have an unintended effect on the computer network system 140B. The analysis server 104 can determine a difference between content in a test network message (such as an environment variable in the test network message) and content in a network message from a previously recorded session (such as an environment variable in the previous network message). Again, an unexpected change in the content (such as an environment variable) can indicate that the updated code instructions have an unintended effect on the computer network system 140B. The analysis server 104 can determine a difference between server invocation sequence data in a test network message and server invocation sequence data in a network message from a previously recorded session. An unexpected change in the server order sequence can indicate that the updated code instructions have an unintended effect on the computer network system 140B. In some embodiments, the analysis server 104 can generate test summary data. The analysis server 104 can aggregate log data and determine summary information, such as, but not limited to, number of changes in log data, a change in aggregated, and/or a change to the dependency graph.

At block 618, a test result can be provided. The test client 108 can provide the test results from the analysis server 104. In some embodiments, the test results can include one or more of the following: a difference between first log data from a test replay and second log data from a previously recorded session; a difference between the second header of the test network message and a header of the network message; a changed in elapsed time to process a network message; a difference between the environment variable from a test network message and an environment variable from a network message from a previously recorded session; a difference between server invocation sequence data in the test network message and server invocation sequence data from the network message from the previously recorded sessions. In some embodiments, the test results can include summary data as described herein. In some embodiments, the test results can be provided in a graphical user interface. The graphical user interface can include, but is not limited to, a dashboard user interface with metrics and/or alerts. In other embodiments, the test client 108 can provide the test results in a command-line interface.

While some of the embodiments described herein include a CDN 130 and/or a reverse proxy, the systems and methods described herein can be applied to other embodiments that do not use a CDN 130 or a reverse proxy. The methodology described herein for reverse engineering a computer network system and/or testing a computer network system can be used in any computer network system, including those computer network systems without a CDN 130 or a reverse proxy.

Not necessarily all objects or advantages may be achieved in accordance with any particular embodiment described herein. Thus, certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Further, the term "each", as used herein, in addition to having its ordinary meaning, can mean any subset of a set of elements to which the term "each" is applied. The term "substantially" when used in conjunction with the term "real time" can refer to speeds in which no or little delay occurs.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system comprising:
   a data storage medium; and
   one or more computer hardware processors in communication with the data storage medium, wherein the one or more computer hardware processors are configured to execute computer-executable instructions to at least:
      receive, at a first server, a network message;
      store, at the first server, first log data in the data storage medium, the first log data comprising:
         a first header of the network message at an entry point at the first server; and
         a second header of the network message at an exit point at the first server;
      receive, at a second server, the network message;
      store, at the second server, second log data in the data storage medium, the second log data comprising server invocation sequence data;
      determine, from the first log data, a header modification based on a change from the first header to the second header;
      determine, from the second log data, a dependency of the second server on the first server based on the server invocation sequence data; and
      provide a report comprising:
         a first indication of the header modification by the first server; and
         a second indication of the dependency of the second server on the first server.

2. The system of claim 1, wherein the network message corresponds to an HTTP request.

3. The system of claim 1, wherein the one or more computer hardware processors are configured to execute further computer-executable instructions to at least:
  determine content from the network message at an exit point at the second server, wherein the second log data comprises the content; and
  determine, from the second log data, functionality at the second server based on the content from the network message,
  wherein the report further comprises a third indication of the functionality at the second server.

4. The system of claim 1, wherein the one or more computer hardware processors are configured to execute further computer-executable instructions to at least:
  determine, at the first server, an elapsed time to process the network message,
  wherein the report further comprises a third indication of the elapsed time at the first server.

5. The system of claim 1, wherein the one or more computer hardware processors are configured to execute further computer-executable instructions to at least:
  receive, via an Application Programming Interface, a request to log network data associated with a domain name for a period of time; and
  initiate logging of network data associated with the domain name for the period of time, wherein the network message is associated with the domain name.

6. The system of claim 1, wherein the one or more computer hardware processors are configured to execute further computer-executable instructions to at least:
  receive, via an Application Programming Interface, a request to log network data associated with at least one of a type of network message, a type of domain name, or a message identifier; and
  initiate logging of network data associated with the at least one of the type of network message, the type of domain name, or the message identifier, wherein the network message is associated with the at least one of the type of network message, the type of domain name, or the message identifier.

7. A computer-implemented method comprising:
  loading a snapshot of a computer network system in a virtualized environment;
  updating, in the snapshot of the computer network system, a configuration to point to a mock server and code instructions to a first server in the snapshot of the computer network system, wherein updating the snapshot results in an updated snapshot of the computer network system;
  transmitting, to the updated snapshot of the computer network system, a test network message;
  receiving, at a first server in the updated snapshot of the computer network system, the test network message;
  storing, at the first server, first log data in a data storage medium, the first log data comprising:
    a first header of the test network message at an entry point at the first server; and
    a second header of the test network message at an exit point at the first server,
    wherein the first server is configured to request and receive response data from the mock server;
  receiving second log data associated with a previous recording of the computer network system and a network message corresponding to the test network message;
  determining a difference between the first log data and the second log data; and
  providing a test result comprising the difference between the first log data and the second log data.

8. The computer-implemented method of claim 7 further comprising:
  disabling an external connection with the first server in the updated snapshot of the computer network system.

9. The computer-implemented method of claim 7, wherein determining the difference between the first log data and the second log data further comprises:
  determining a difference between the second header of the test network message and a header of the network message.

10. The computer-implemented method of claim 7 further comprising:
  determining, at the first server, a first elapsed time to process the test network message, the first log data comprising the first elapsed time, wherein determining the difference between the first log data and the second log data further comprises:
    identifying that the first elapsed time to process the test network message and an elapsed time from the second log data fail to satisfy a threshold.

11. The computer-implemented method of claim 7 further comprising:
  determining a first environment variable at the exit point at the first server, the first log data comprising the first environment variable, wherein determining the difference between the first log data and the second log data further comprises:
    determining a difference between the first environment variable and an environment variable of the network message.

12. The computer-implemented method of claim 7 further comprising:
  determining, at the first server, first server invocation sequence data, wherein the first log data further comprises the first server invocation sequence data, wherein determining the difference between the first log data and the second log data further comprises:
    determining a difference between the first server invocation sequence data and server invocation sequence data of the network message.

13. The computer-implemented method of claim 7 further comprising:
  receive, via an Application Programming Interface, a request to replay processing of the test network message, the request comprising a message identifier for the test network message.

14. A system comprising:
  a data storage medium; and
  one or more computer hardware processors in communication with the data storage medium, wherein the one or more computer hardware processors are configured to execute computer-executable instructions to at least:
    receive, at a first server, a network message;
    store, at the first server, first log data in the data storage medium, the first log data comprising:
      a first header of the network message at an entry point at the first server; and
      a second header of the network message at an exit point at the first server;
    receive, at a second server, the network message;
    store, at the second server, second log data in the data storage medium, the second log data comprising content from the network message at an exit point at the second server;

determine, from the first log data, a header modification based on a change from the first header to the second header;

determine, from the second log data, functionality at the second server based on the content from the network message; and provide a report comprising:
- a first indication of the header modification by the first server; and
- a second indication of the functionality at the second server.

15. The system of claim 14, wherein the one or more computer hardware processors are configured to execute further computer-executable instructions to at least:

determine, at the second server, server invocation sequence data, wherein the second log data further comprises the server invocation sequence data; and determine, from the second log data, a dependency of the second server on the first server based on the server invocation sequence data, wherein the report further comprises a third indication of the dependency of the second server on the first server.

16. The system of claim 14, wherein the one or more computer hardware processors are configured to execute further computer-executable instructions to at least:

determine, at the second server, a domain name associated with the network message, wherein the report further comprises a third indication of the functionality at the second server associated with the domain name.

17. The system of claim 14, wherein the one or more computer hardware processors are configured to execute further computer-executable instructions to at least:

determine, at the first server, an elapsed time to process the network message, wherein the report further comprises a third indication of the elapsed time at the first server.

18. The system of claim 14, wherein the one or more computer hardware processors are configured to execute further computer-executable instructions to at least:

create snapshot of a computer network system, the computer network system comprising the first server and the second server;

load the snapshot of the computer network system in a virtualized environment;

update, in the snapshot of the computer network system, code instructions to a first server in the snapshot of the computer network system, wherein updating the snapshot results in an updated snapshot of the computer network system;

determine a test network message based on the network message;

transmit, to the updated snapshot of the computer network system, the test network message;

receive, at a first server in the updated snapshot of the computer network system, the test network message;

store, at the first server in the updated snapshot, third log data in the data storage medium, the first log data comprising:
- a third header of the test network message at an entry point at the first server in the updated snapshot; and
- a fourth header of the test network message at an exit point at the first server in the updated snapshot;

determine a difference between the first log data and the second log data; and provide a test result comprising the difference between the first log data and the second log data.

19. The system of claim 14, wherein the one or more computer hardware processors are configured to execute further computer-executable instructions to at least:

receive, via an Application Programming Interface, a request to log network data associated with a domain name for a period of time; and initiate logging of network data associated with the domain name for the period of time, wherein the network message is associated with the domain name.

20. The system of claim 14, wherein the one or more computer hardware processors are configured to execute further computer-executable instructions to at least:

receive, via an Application Programming Interface, a request to log network data associated with at least one of a type of network message, a type of domain name, or a message identifier; and initiate logging of network data associated with the at least one of the type of network message, the type of domain name, or the message identifier, wherein the network message is associated with the at least one of the type of network message, the type of domain name, or the message identifier.

* * * * *